(12) United States Patent
Chen

(10) Patent No.: US 10,802,381 B2
(45) Date of Patent: Oct. 13, 2020

(54) TRANSVERSE TUBE AND A PHOTOGRAPHY EQUIPMENT SUPPORT

(71) Applicant: Yueqing Chuangyi Photography Equipment Co., Ltd., Yueqing, Zhejiang (CN)

(72) Inventor: Qingyuan Chen, Yueqing (CN)

(73) Assignee: YUEQING CHUANGYI PHOTOGRAPHY EQUIPMENT CO., LTD., Yueqing (CN)

(*) Notice: Subject to any disclaimer, the term of this patent is extended or adjusted under 35 U.S.C. 154(b) by 0 days.

(21) Appl. No.: 15/150,538

(22) Filed: May 10, 2016

(65) Prior Publication Data

US 2017/0146891 A1    May 25, 2017

(30) Foreign Application Priority Data

Nov. 23, 2015   (CN) ..................... 2015 2 0938276 U

(51) Int. Cl.
*G03B 17/56* (2006.01)
*F16M 11/04* (2006.01)
(Continued)

(52) U.S. Cl.
CPC ......... *G03B 17/561* (2013.01); *F16M 11/045* (2013.01); *F16M 11/14* (2013.01);
(Continued)

(58) Field of Classification Search
CPC .................................................. G03B 17/561
(Continued)

(56) References Cited

U.S. PATENT DOCUMENTS 5,449,138 A * 9/1995 Ciancio ................. F16M 11/06
  248/123.2
5,595,206 A * 1/1997 Soria Vega ........... F16K 27/067
  137/15.22
(Continued)

FOREIGN PATENT DOCUMENTS

CN     204629014 U  *  9/2015

OTHER PUBLICATIONS

Digital Picture, "Gitzo GT3542LS Systematic 6X Carbon Fiber Tripod Review", Mar. 8, 2014, https://www.the-digital-picture.com/Reviews/Gitzo-GT3542LS-Systematic-Carbon-Fiber-Tripod.aspx (Year: 2014).*

*Primary Examiner* — Clayton E. LaBalle
*Assistant Examiner* — Leon W Rhodes, Jr.

(57) ABSTRACT

The present utility model relates to a transverse tube and a photographic equipment support. The purpose of the utility model is to provide a transverse tube that can be used with a common photographic equipment to allow a centre shaft transverse, and provide a photographic equipment containing the transverse tube. The technical solution is as follows: a transverse tube is detachably mounted on a base of a photographic equipment support in an insertion manner and can move and rotate along its axis relative to the base; the transverse tube comprises a tube body which a centre shaft can be coaxially embedded into and which is able to move along its axis relative to the centre shaft, and a rotary seat arranged on the top of the tube body; an axial through hole is provided on the rotary seat along its axis to vertically accomodate the centre shaft, and the axial through hole and the tube body are coaxially arranged; a U-shaped notch with a upward opening and a radial through hole which is radially opposite to the notch are provided at the upper part of the rotary seat, to horizontal support the centre shaft. The (Continued)

present utility model is suitable for the technical field of photographic equipment.

1 Claim, 13 Drawing Sheets

(51) Int. Cl.
*F16M 11/16* (2006.01)
*F16M 11/32* (2006.01)
*F16M 11/28* (2006.01)
*F16M 11/14* (2006.01)

(52) U.S. Cl.
CPC ............. *F16M 11/16* (2013.01); *F16M 11/28* (2013.01); *F16M 11/32* (2013.01); *F16M 2200/027* (2013.01)

(58) Field of Classification Search
USPC .......................... 396/419, 428; 248/178, 187
See application file for complete search history.

(56) References Cited

U.S. PATENT DOCUMENTS

| | | | | |
|---|---|---|---|---|
| 5,934,628 | A * | 8/1999 | Bosnakovic | B60Q 7/00 248/169 |
| 6,042,080 | A * | 3/2000 | Shepherd | B60R 11/00 248/163.1 |
| 6,164,843 | A * | 12/2000 | Battocchio | F16M 11/32 248/122.1 |
| 6,983,916 | B2 * | 1/2006 | Raynaud | F16M 11/046 248/163.2 |
| 7,684,694 | B2 * | 3/2010 | Fromm | F16M 11/14 396/376 |
| 8,418,973 | B2 * | 4/2013 | Liu | F16M 11/04 248/176.1 |
| 9,574,706 | B2 * | 2/2017 | Brown | F16M 11/041 |
| 2003/0226941 | A1 * | 12/2003 | Crain | F16B 7/1463 248/166 |
| 2004/0179835 | A1 * | 9/2004 | McKay | G03B 17/02 396/421 |
| 2007/0068564 | A1 * | 3/2007 | Wu | A45B 25/06 135/38 |
| 2015/0240986 | A1 * | 8/2015 | Mendo | F16M 11/18 248/124.1 |

* cited by examiner

TRANSVERSE TUBE AND A PHOTOGRAPHY EQUIPMENT SUPPORT

TECHNICAL FIELD

The present utility model relates to a transverse tube and a photographic equipment support, which are mainly used in the field of photographic equipment.

BACKGROUND

With the growing demand for photography, a tripod enabling a centre shaft transverse has emerged in the market, as the common ones are no longer capable of meeting people's requirements. However, this new photographical helper is expensive and inconvenient to use, especially when the centre shaft is in transverse state, if a shooting height is required to be readjusted, the length of each legs is required to be reset, and corresponding horizontal height is also required to be readjusted. Meanwhile, if original common tripod is replaced with the tripod with a transverse centre shaft, this will not only bring about a waste of the original common tripod, but also induce a considerable replacement cost.

SUMMARY

In efforts to overcome the defects described above, the technical problem to be solved by the present utility model is to provide a transverse tube suitable to use together with a common photographic equipment to allow a centre shaft transverse.

The other object of the present utility model is to provide a photographic equipment support containing the above transverse tube.

The technical solution of the present utility model is as follows: a transverse tube can be detachably mounted on a base of a photographic equipment support in an insertion manner and can move and rotate along its axis relative to the base; and the transverse tube comprises a tube body which a central shaft can be coaxially embedded into and which is able to move along its axis relative to the centre shaft, and a rotary seat arranged on the top of the tube body.

An axial through hole is provided on the rotary seat along its axis to vertically accomodate the centre shaft, and the axial through hole and the tube body are coaxially arranged.

A U-shaped notch with an upward opening and a radial through hole which is radially opposite to the notch are provided at the upper part of the rotary seat, to horizontally support the centre shaft.

A centre shaft sleeve is provided in the rotary seat to coaxially sleeve the centre shaft. The centre shaft sleeve rotates with the centre shaft when the centre shaft switch between its horizontal and vertical orientations to avoid a collision between the centre shaft and rotary seat; and the centre shaft can move along its axis relative to the centre shaft sleeve.

A pivot socket is rotatably mounted into the rotary seat. The rotary axis of the pivot socket is vertical to the axis of the axial through hole and radial through hole to achieve a switch of the centre shaft between horizontal and vertical orientations; and the pivot socket coaxially sleeves outside the centre shaft sleeve.

A centre shaft locking unit is mounted on the rotary seat, and the centre shaft locking unit directly acts on the centre shaft sleeve to lock the centre shaft.

The rotary seat comprises a base, a rotating body that is connected to the base and can rotate axially relative to the base, and a locknut which is mounted on the rotating body and directly acts on the base to tightly lock the base with the rotating body; and the axial through hole, U-shaped notch, and radial through hole are all provided on the rotating body.

Two cylindrical rotary grooves are radially positioned in a straight line on the inner wall of the rotary seat, two cylindrical through holes are radially positioned in a straight line on the pivot socket, and two cylindrical locating posts are radially positioned in a straight line on the outer wall of the centre shaft sleeve; and the two locating posts respectively pass through the two through holes to extend into the two rotary grooves.

The centre shaft sleeve is uniformly provided with several notches on the side wall of its lower part and parallel to its axis.

The centre shaft is provided with grooves on its outer surface and parallel to its axis, and convexes are arranged on the inner wall of the centre shaft sleeve, wherein the convexes are matched with the grooves.

The tube body is marked with measure scale on its outer surface.

The centre shaft is an extensible structure.

A photographic equipment support comprising a base and a legs hinged on the base. The aforesaid transverse tube is coaxially mounted to the base, wherein the centre shaft is mounted in transverse tube.

A sleeve-locking unit is mounted on the base.

The sleeve-locking unit comprises a tube jacket arranged in a tubular cavity formed between the base and tube body, and a tube-locking knob radially passing through the base and directly acting on the tube jacket to achieve the lock.

The tube-locking unit comprises a locking sleeve coaxially fixed on the base. The locking sleeve is uniformly provided with several gaps parallel to its axis on the side wall of its free end, and the locking sleeve is in threaded connection with a locking knob, wherein the locking knob can radially press the locking sleeve to achieve its locking with the tube body.

The locking sleeve is positioned either above or below the base.

The present utility model has the following benefits: 1. The transverse tube of the present utility model can be mounted on the common tripod to allow a centre shaft transverse, thereby avoiding high costs resulting from replacement and waste of original resources; 2. A centre shaft sleeve for coaxially sleeving the centre shaft is provided in the rotary seat, and the centre shaft sleeve rotates with the centre shaft when the centre shaft switch between its horizontal and vertical orientations to effectively avoid the damages caused by the collision between the centre shaft and rotary seat, and thus extending the service life of the centre shaft; 3. A centre shaft locking unit is mounted on the rotary seat, wherein the centre shaft locking unit directly acts on the centre shaft sleeve to lock the centre shaft, which readily achieve the fixation of the centre shaft; 4. The rotary seat comprises a base, a rotating body that is connected to the base and can rotate axially relative to the base, and a locknut which is mounted on the rotating body and directly acts on the base to tightly lock the base with the rotating body, thus making the horizontal adjustment of shooting angle easier; 5. A tube-locking unit for locking the transverse tube is mounted on the base of the photographic equipment support. This allows an adjusted height for a transverse (horizontal) or vertical orientations of the centre shaft according to the practical requirements, thus saving the trouble to reset balance/level because of adjusting the length of legs; 6. The tube body is marked with measure scale on its outer surface to enable more accurately adjust the shooting height; and 7. The centre shaft is an extensible structure to elongate and retract according to the practice uses, that is, it provides a wide range of applications.

DESCRIPTION OF THE EMBODIMENTS

Figure 1:
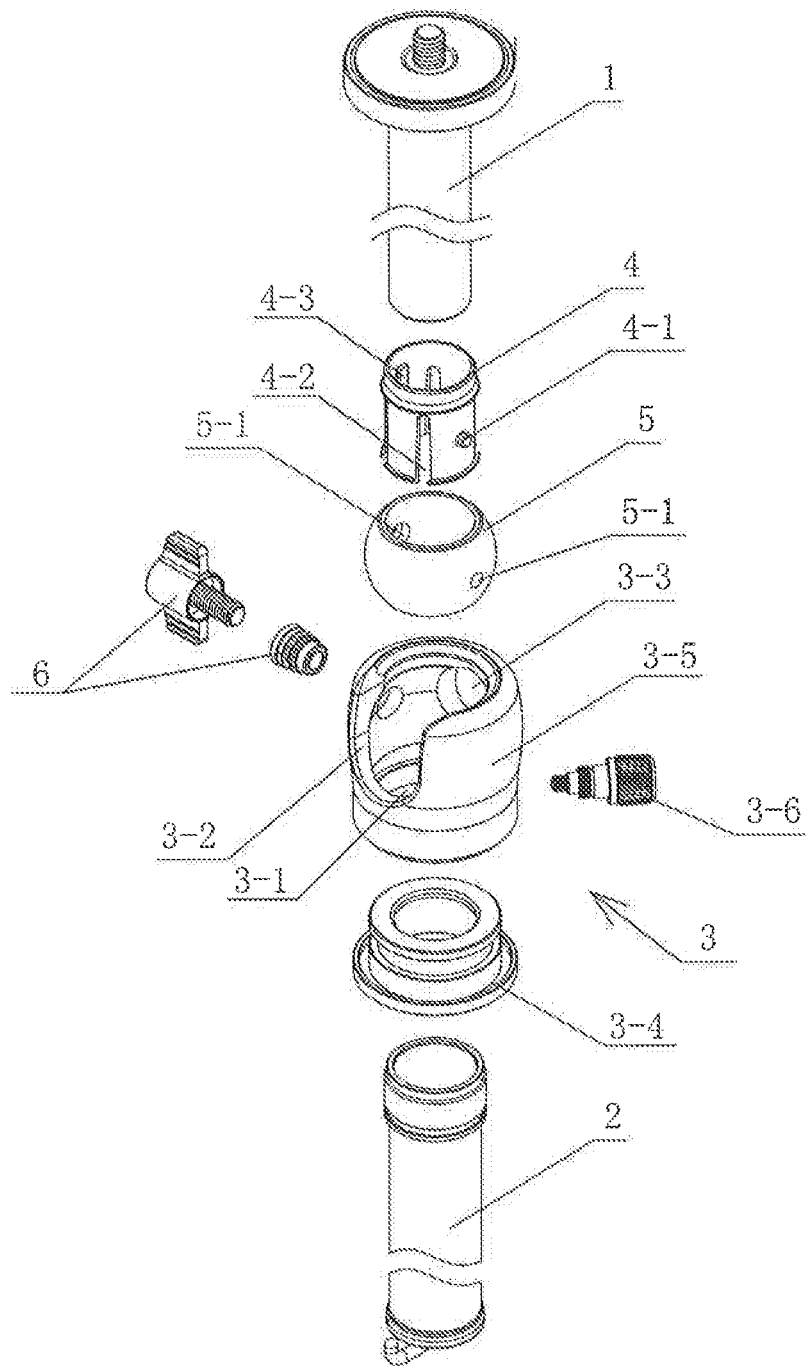
FIG. 1 is an explosive view of the transverse tube of the present utility model.
Figure 2:
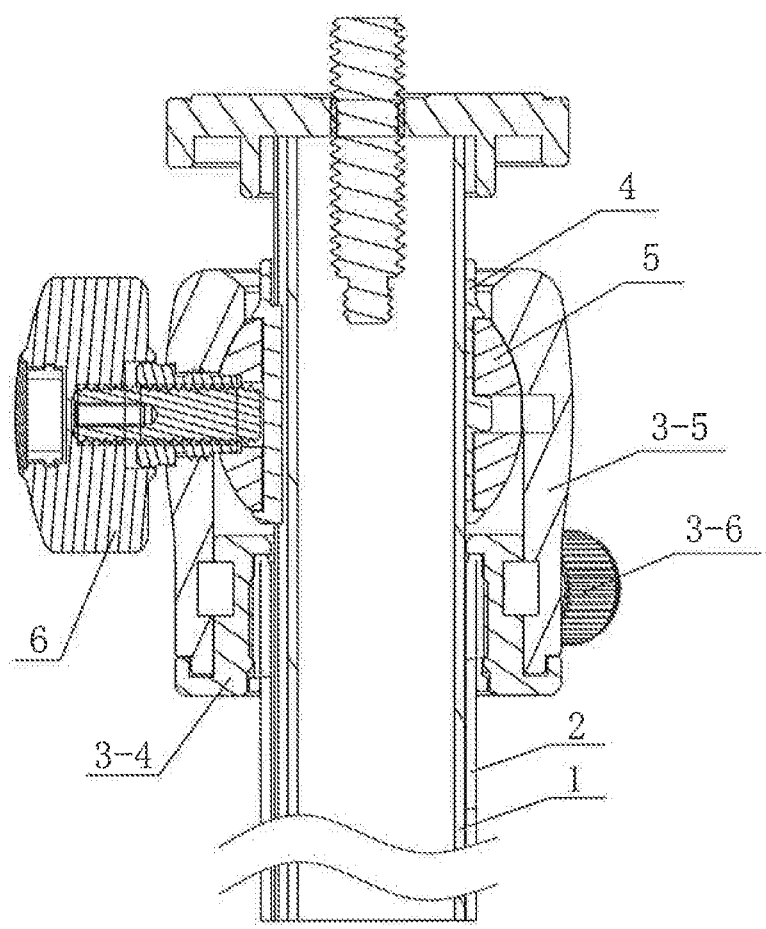
FIG. 2 is a section view of the transverse tube of the present utility model.
Figure 3:
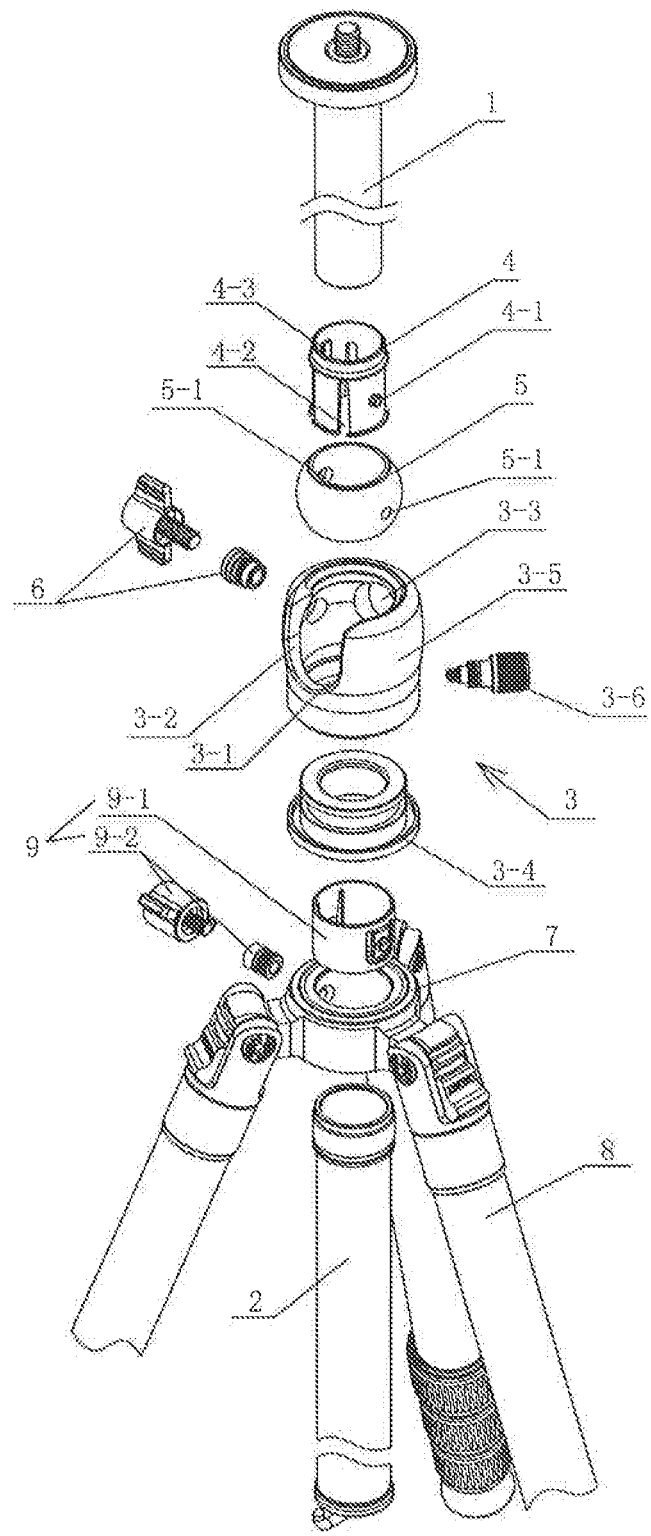
FIG. 3 is an explosive view of the photographic equipment support in Example 1.
Figure 4:
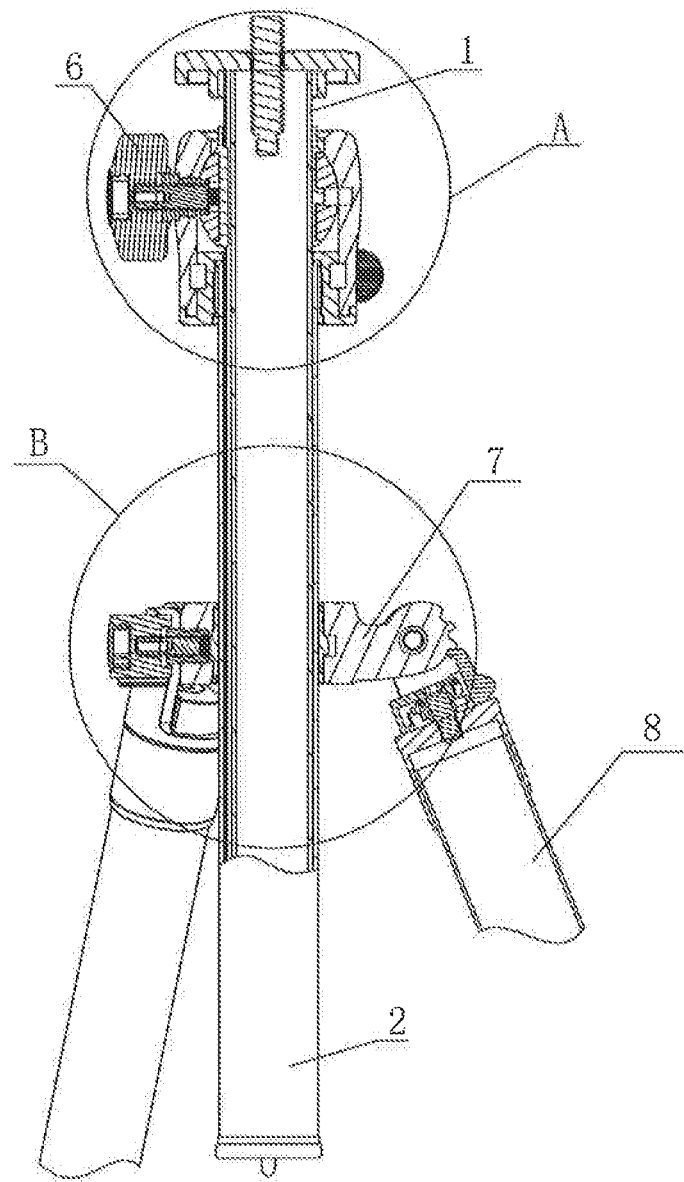
FIG. 4 is a section view of the photographic equipment support in Example 1.
Figure 5:
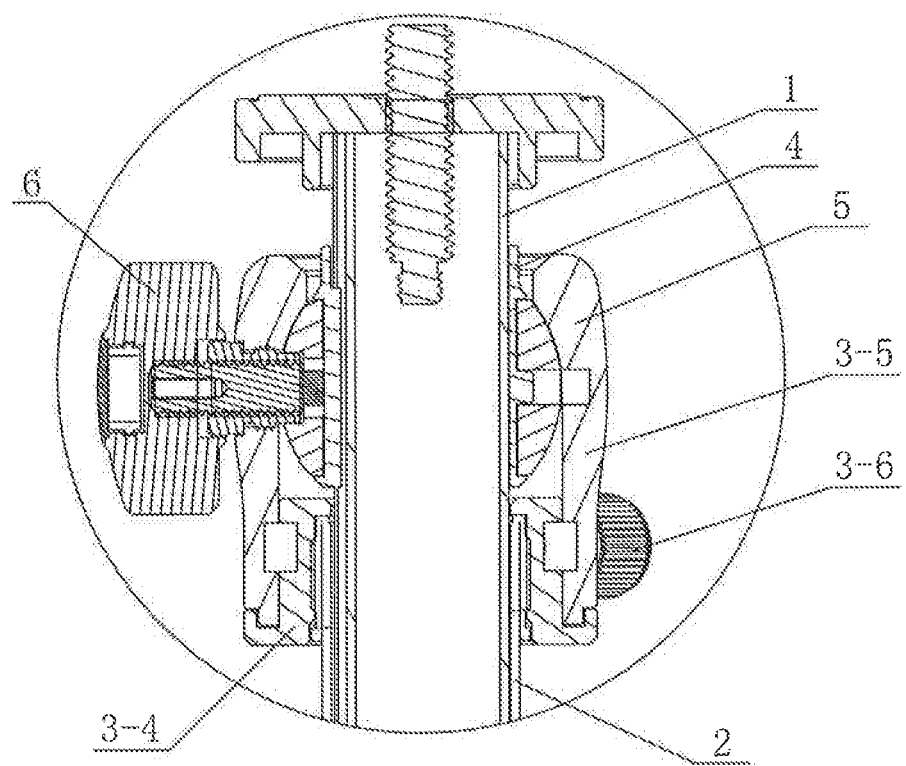
FIG. 5 is an enlarged drawing of section A of FIG. 4.
Figure 6:
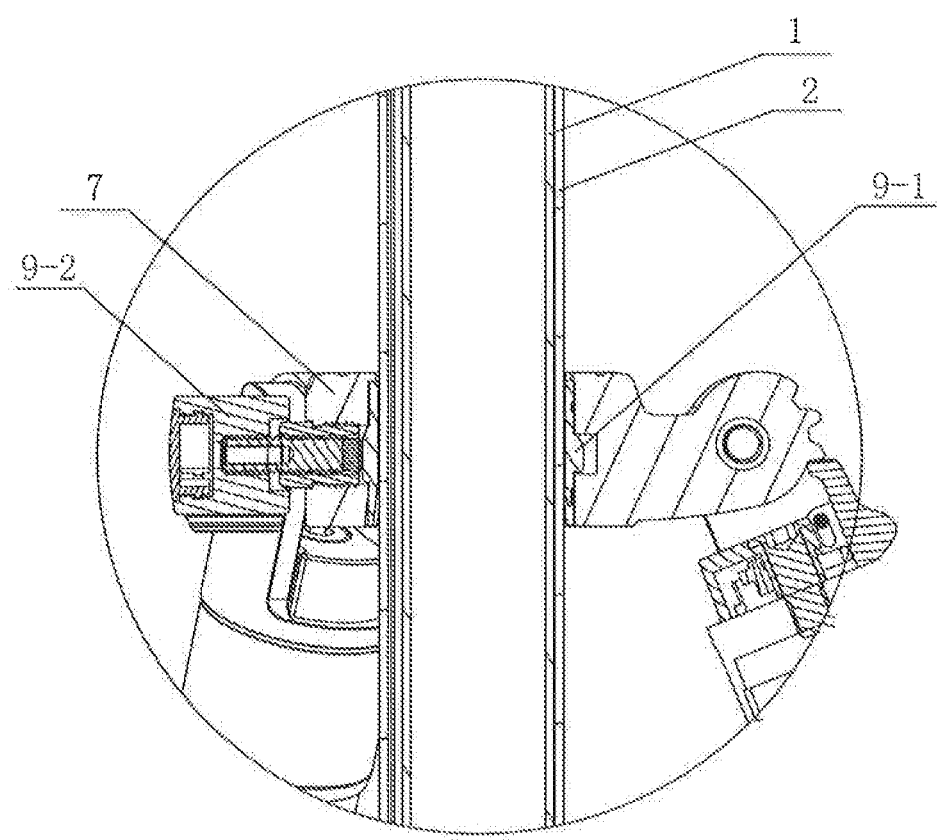
FIG. 6 is an enlarged drawing of section B of FIG. 4.
Figure 7:
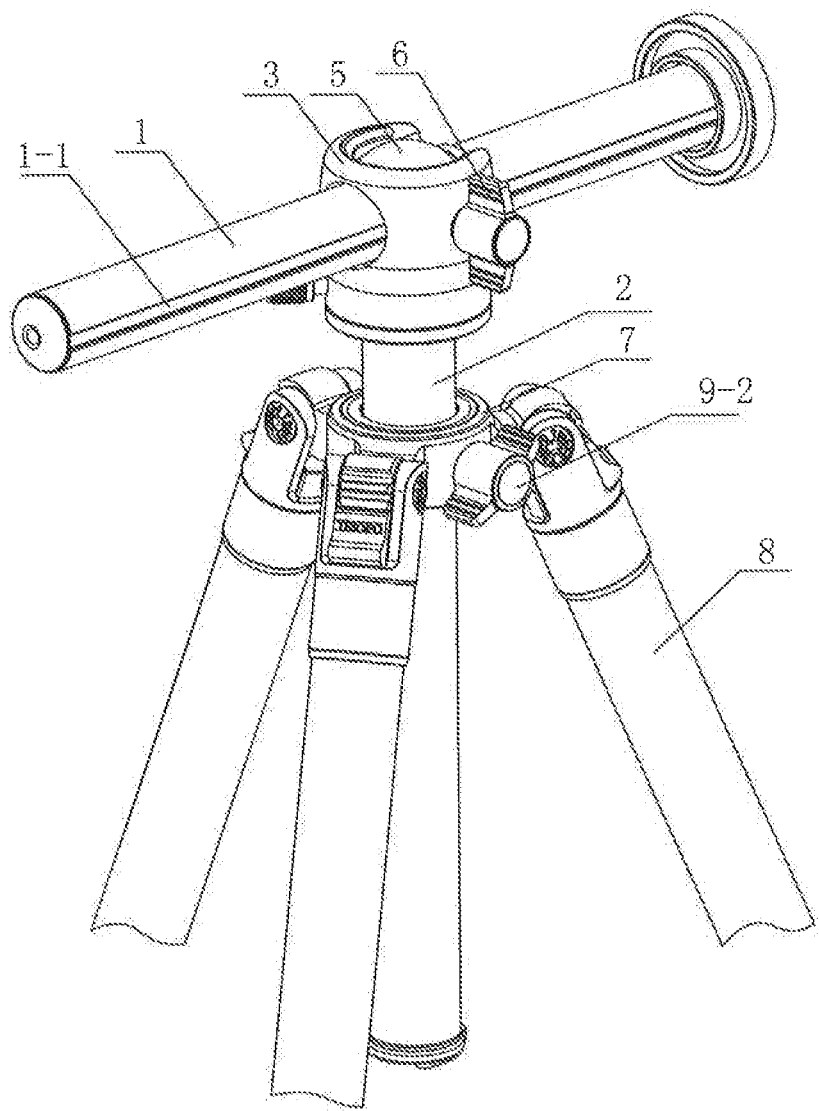
FIG. 7 shows a transverse state of the centre shaft of the photographic equipment support in Example 1.

As shown in FIGS. 1 and 2, a transverse tube in the Example is detachably mounted on a base 7 of a photographic equipment support in an insertion manner and can move and rotate along its axis relative to the base 7; and the transverse tube comprises a tube body 2 which can have a centre shaft coaxially embedded therein and which is able to move along its axis relative to the centre shaft 1, and a rotary seat 3 arranged on the top of the tube body 2.

An axial through hole 3-1 is provided on the rotary seat 3 along its axis, wherein the axial through hole 3-1 is used to vertically accommodate the centre shaft 1, and the axial through hole and the tube body 2 are coaxially arranged.

A U-shaped notch 3-2 with a upward opening, and a radial through hole 3-3 which is radial opposite to the notch are provided at the upper part of the rotary seat 3, to horizontally support the centre shaft 1.

A centre shaft sleeve 4 is provided in the rotary seat 3 (the centre shaft is coaxially embedded in the centre shaft sleeve and is movable along the axis relative to the centre shaft sleeve 4). The centre shaft sleeve rotates with the centre shaft 1 when the centre shaft 1 switches between a horizontal orientation and a vertical orientation to effectively avoid the damage caused by a collision between the centre shaft 1 and rotary seat 3 during the rotation of the centre shaft, and thus extend the service life of centre shaft 1.

To facilitate the switch of centre shaft 1 between horizontal and vertical orientations, a pivot socket 5 is rotatably mounted into the rotary seat 3. The rotary axis of the pivot socket is vertical to the axis of the axial through hole 3-1 and radial through hole 3-3 to achieve a switch of the centre shaft 1 between horizontal and vertical orientations; and the pivot socket 5 coaxially sleeves outside the centre shaft sleeve 4. In the Example, two cylindrical rotary grooves are radially positioned in a straight line on the inner wall of the rotary seat 3, two cylindrical through holes 5-1 are radially positioned in a straight line on the pivot socket 5, and two cylindrical locating posts 4-1 are radially positioned in a straight line on the outer wall of the centre shaft sleeve 4; and the two locating posts 4-1 respectively pass through the two through holes 5-1 to extend into the two rotary grooves, thus allowing the centre shaft sleeve 4 and pivot socket 5 to rotate relative to rotary seat 3.

A centre shaft locking unit 6 is mounted at the rotary seat 3 acting directly on centre shaft sleeve 4 to lock the centre shaft 1. The centre shaft locking unit radially presses the centre shaft sleeve 4 to lock centre shaft 1.

The rotary seat 3 comprises a base 3-4, a rotating body 3-5 that is connected to the base and can axially relative to the base, and a locknut 3-6 which is mounted on the rotating body 3-5 and directly acts on the base 3-4 to tightly lock the base with the rotating body, thus making the adjustment of shooting angle easier in horizontal direction; and the axial through hole 3-1, U-shaped notch 3-2, and radial through hole 3-3 are all provided on the rotating body 3-5.

The centre shaft sleeve 4 is uniformly provided with several notches 4-2 on the side wall of its lower part and parallel to its axis, facilitating the pressing and fixing effect of the centre shaft locking unit 6.

The centre shaft 1 is provided with grooves 1-1 on its outer surface and parallel to its axis, and convexes 4-3 are arranged on the inner wall of the centre shaft sleeve 4, wherein the convexes (4-3) match with the grooves, thus effectively preventing centre shaft 1 from rotating relative to the centre shaft sleeve 4.

The tube body 2 is marked with measure scale on its outer surface to facilitate to more accurately adjust the shooting height.

The transverse tube in the Example can be mounted on the common tripod to allow a centre shaft to be installed in a transverse orientation, thereby avoiding high costs resulting from replacement and waste of original resources.

As shown in FIGS. 3-7, Example 1 illustrates a photographic equipment support comprising a base 7 and legs 8 hinged on the base. The aforesaid transverse tube is coaxially mounted on the base 7, wherein the centre shaft 1 is mounted in the transverse tube. The centre shaft 1 is an extensible structure, and can be formed by successively nesting a plurality of shafts along the same axis, similar with the extensible handle structure of a foldable umbrella. This means it can elongate or retract according to the practical requirements and thus is useful in a wide range of fields, such as criminal investigation.

A tube-locking unit 9 is mounted on the base 7. This allows an adjustable height of the centre shaft in the horizontal or vertical orientations according to the practical requirements, saving the trouble of resetting balance arising from adjusting the length of legs. In this Example, the tube-locking unit 9 comprises a tube jacket 9-1 arranged in a tubular cavity formed between the base 7 and tube body 2, and a tube-locking knob 9-2 radially passing through the base 7 and directly acting on the tube jacket 9-1 to achieve the lock.

This example relates to a photographic equipment support. When there is a need to adjust the relative position between the centre shaft 1 and tube body 2, the centre shaft locking unit 6 is loosened to ensure there is no pressing force between the centre shaft 1 and the centre shaft sleeve 4, and then the centre shaft 1 can move up and down. Tighten the centre shaft locking unit 6 when centre shaft 1 moves to a desired position, to make the centre shaft sleeve 4 deform and press on the surface of centre shaft 1, thus producing a locking effect.

When there is a need to adjust the relative position between tube body 2 and base 7, the tube-locking unit 9 is loosened to ensure there is no pressing force between tube body 2 and tube jacket 9-1. Tighten the tube-locking unit 9 when tube body 2 moves to a desired position to make the tube jacket 9-1 deform and press on the surface of the tube body 2, thus producing a locking effect. Instead of resetting the length of each leg and levelness, a shooting height always can be adjusted during practical use through adjusting the relative position between tube body 2 and base 7, regardless whether the centre shaft 1 is in a transverse or a vertical orientation, thus providing convenience.

Figure 8:
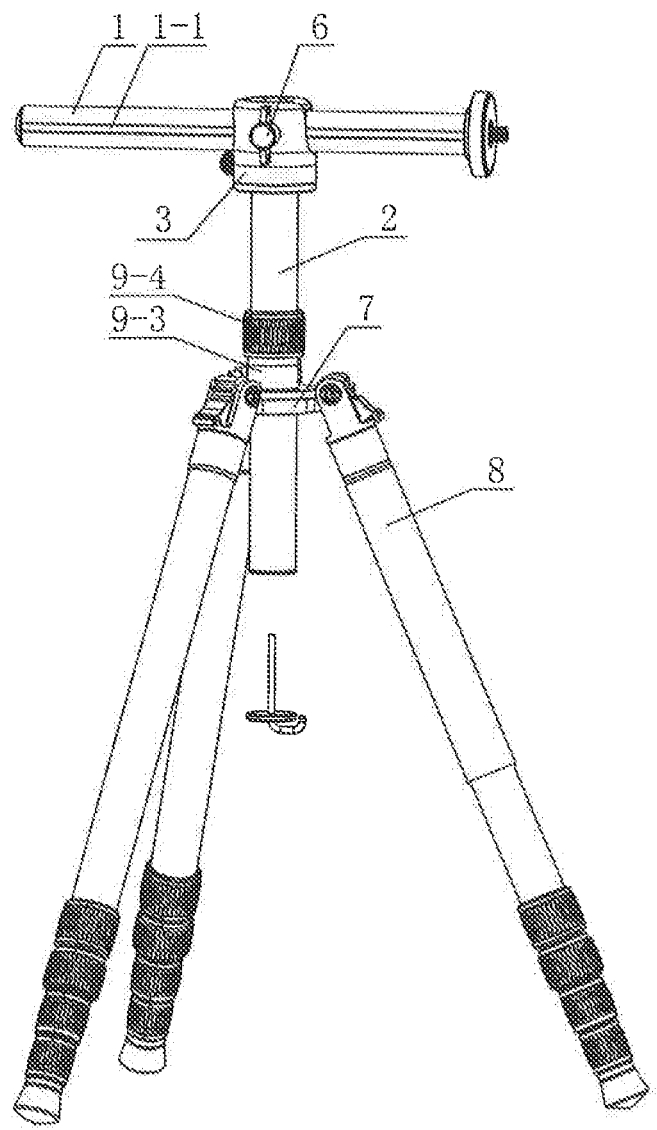
FIG. 8 shows a transverse state of the centre shaft of the photographic equipment support in Example 2.
Figure 9:
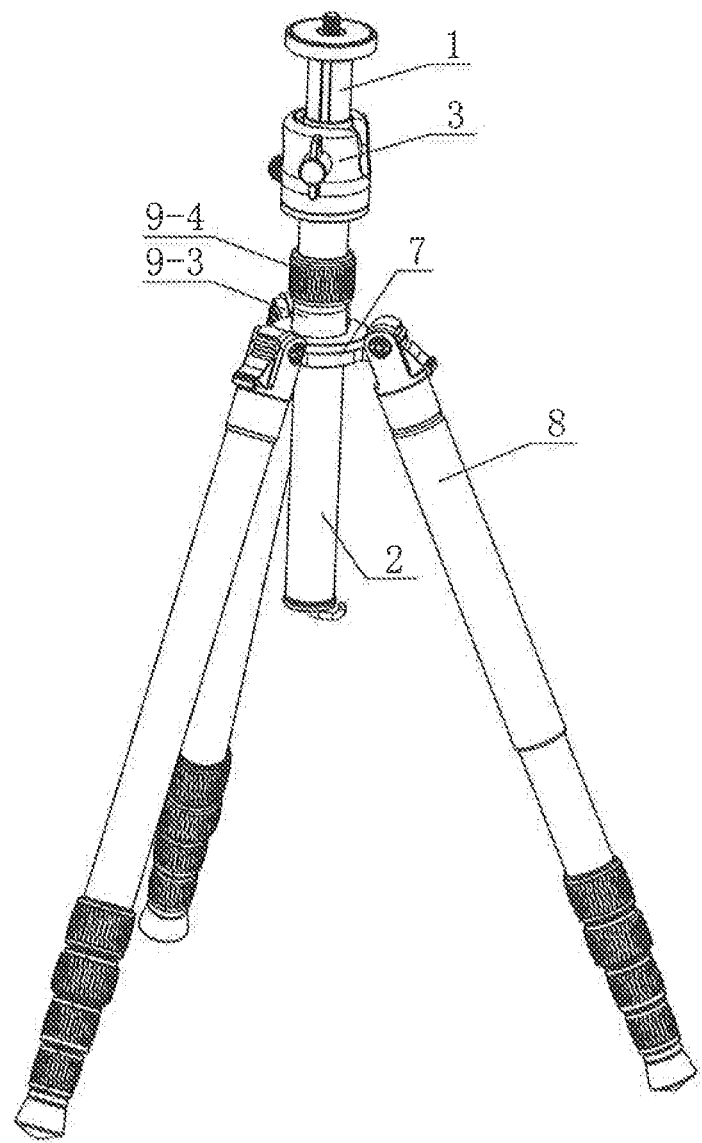
FIG. 9 shows a vertical state of the centre shaft of the photographic equipment support in Example 2.
Figure 10:
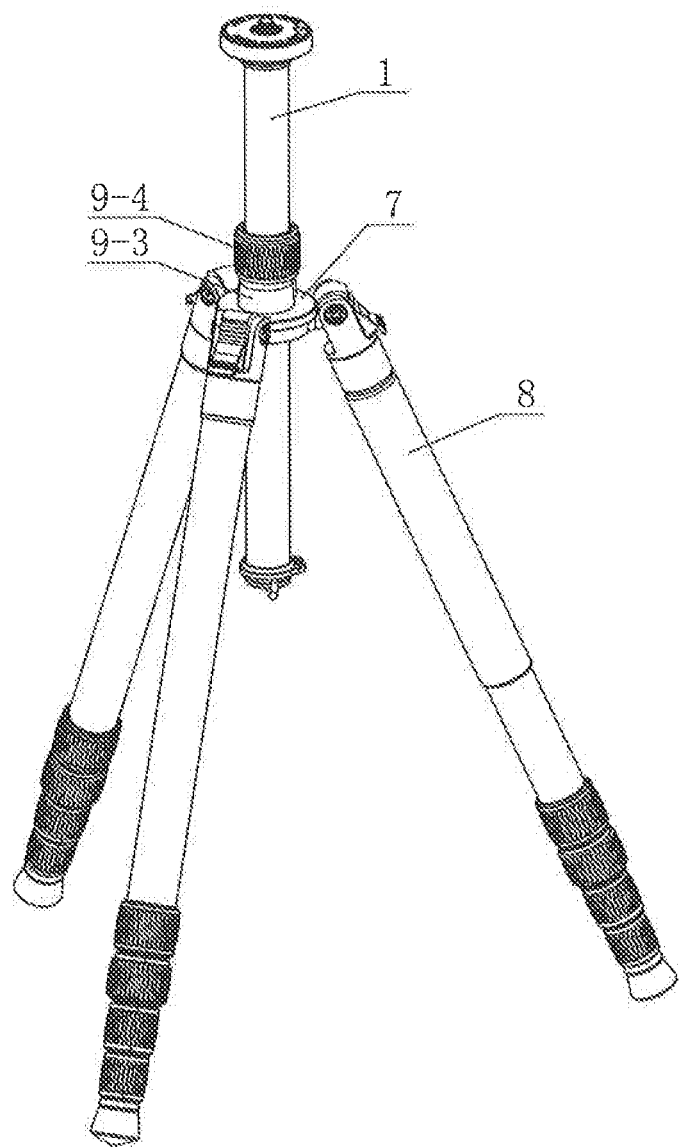
FIG. 10 is a structure schematic showing the assembling of centre shaft and base in FIG. 9 without the transverse tube.

As shown in FIGS. 8-10, Example 2 illustrates a photographic equipment support with a similar structure to Example 1. The differences therebetween are as follows: the tube-locking unit 9 comprises a locking sleeve 9-3 coaxially fixed on the base 7. The locking sleeve is uniformly provided with several gaps parallel to its axis at the side wall of the free end, and the locking sleeve 9-3 is in threaded-connection with a locking knob 9-4, wherein the locking knob 9-4 can radially press on the locking sleeve 9-3 to achieve its locking with the tube body 2; and both the locking sleeve 9-3 and the corresponding locking knob 9-4 are arranged above the base 7.

The Example actually adds said transverse tube to a common tripod, wherein the transverse tube is coaxially mounted in the base 7, and transverse tube has a centre shaft 1 installed thereon.

Figure 11:
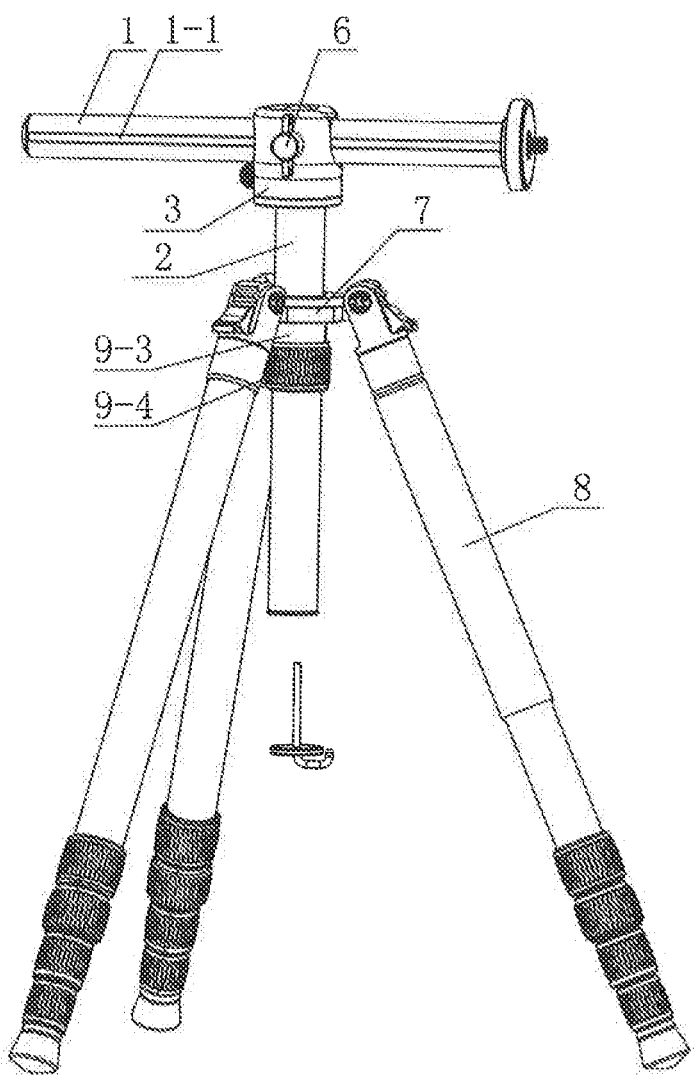
FIG. 11 shows a transverse centre shaft of the photographic equipment support in Example 3.
Figure 12:
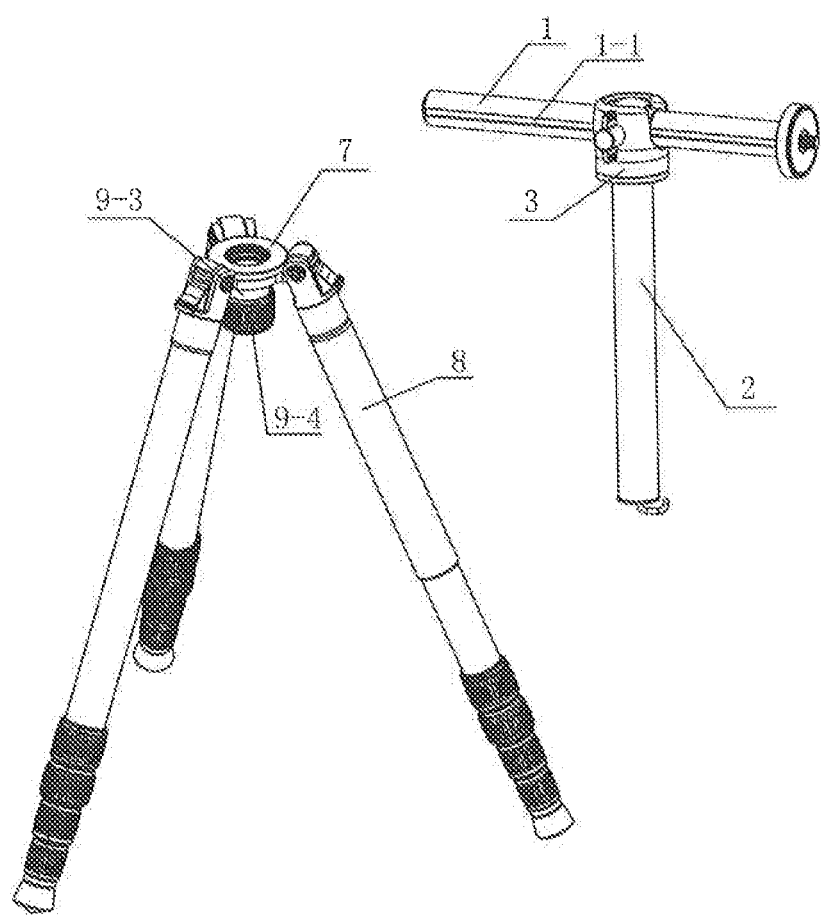
FIG. 12 shows the structure of the individual transverse tube and centre shaft in FIG. 11.
Figure 13:
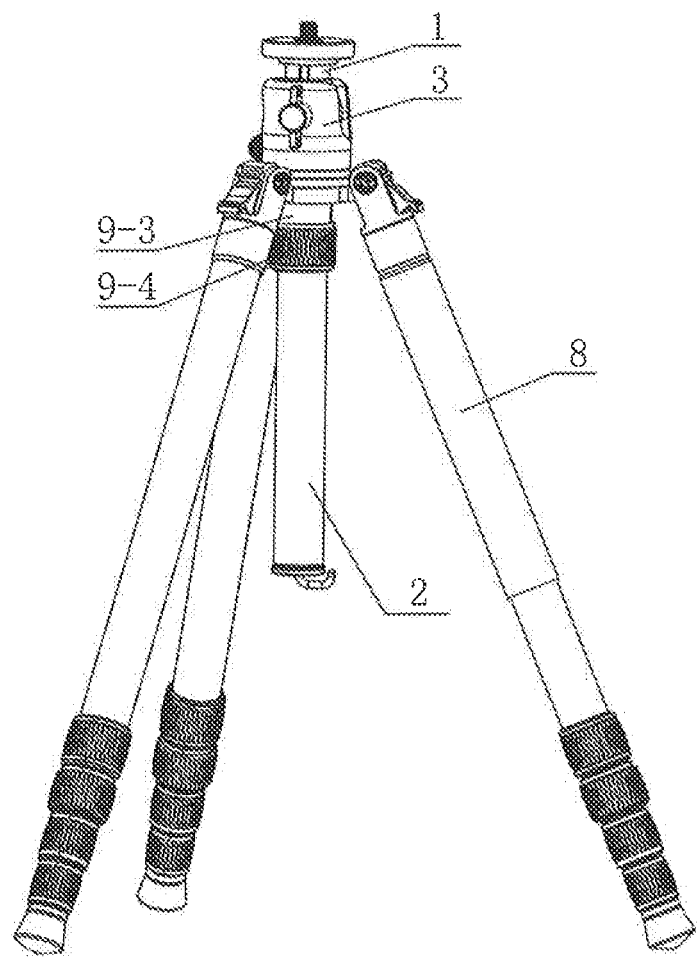
FIG. 13 shows a vertical state of the centre shaft of the photographic equipment support in Example 3.

As shown in FIGS. 11-13, Example 3 illustrates a photographic equipment support with a similar structure to Example 2. The difference therebetween lies in that both the locking sleeve 9-3 and the corresponding locking knob 9-4 are arranged below the base 7.

I claim:
1. A transverse tube, wherein the transverse tube is detachably mounted on a base of a photographic equipment support in an insertion manner and is movable and rotatable along its axis relative to the base; the transverse tube comprises a tube body which a centre shaft is coaxially embeddable into and able to move along its axis relative to the centre shaft, and a rotary seat arranged on the top of the tube body;
   an axial through hole provided on the rotary seat along its axis to vertically accommodate the centre shaft, and the axial through hole and the tube body are coaxially arranged; and
   a U-shaped notch with a upward opening and a radial through hole which is radially opposite to the notch are provided at the upper part of the rotary seat, to horizontally support the centre shaft;
   a centre shaft sleeve provided in the rotary seat to coaxially sleeve the centre shaft, wherein the centre shaft sleeve rotates with the centre shaft when the centre shaft switches between a horizontal orientation and a vertical orientation; the centre shaft movable along its axis relative to the centre shaft sleeve; and
   wherein a pivot socket is rotatably arranged in the rotary seat, the rotary axis of the pivot socket is vertical to the axis of the axial through hole and radial through hole to achieve switching of the centre shaft between the horizontal orientation and the vertical orientation; the pivot socket coaxially sleeves outside the centre shaft sleeve; and
   wherein a centre shaft locking unit is mounted on the rotary seat, and the centre shaft locking unit directly acts on the centre shaft sleeve to lock the centre shaft.

\* \* \* \* \*